May 15, 1962 M. E. ARES 3,034,833
HUB CAP FOR SPOKED WHEELS
Filed Dec. 5, 1958
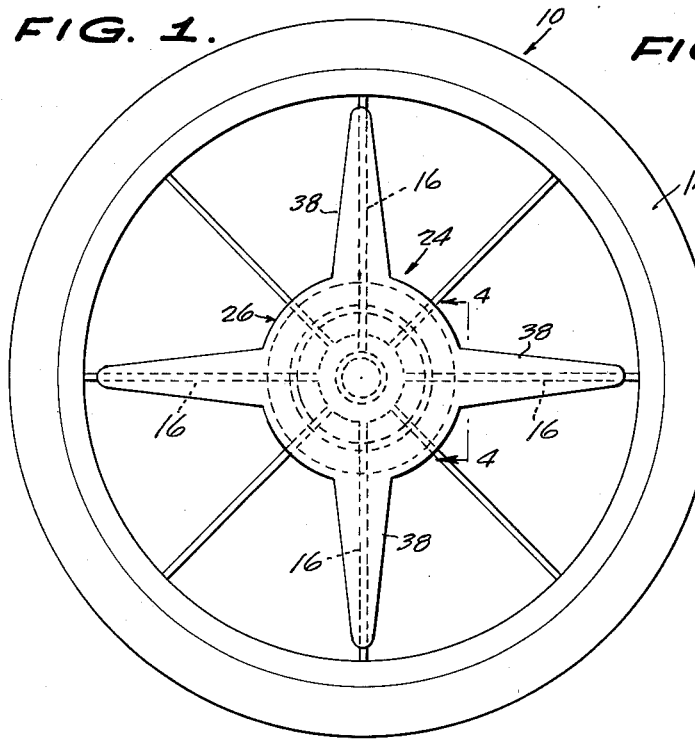
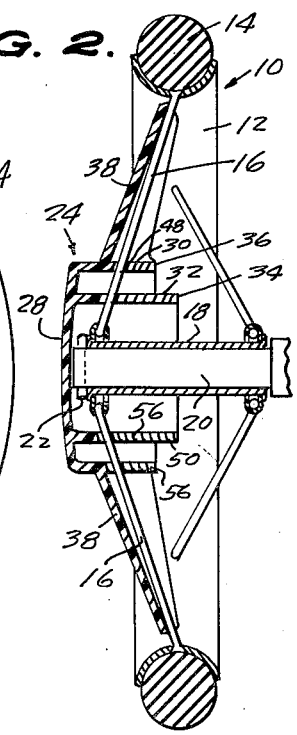
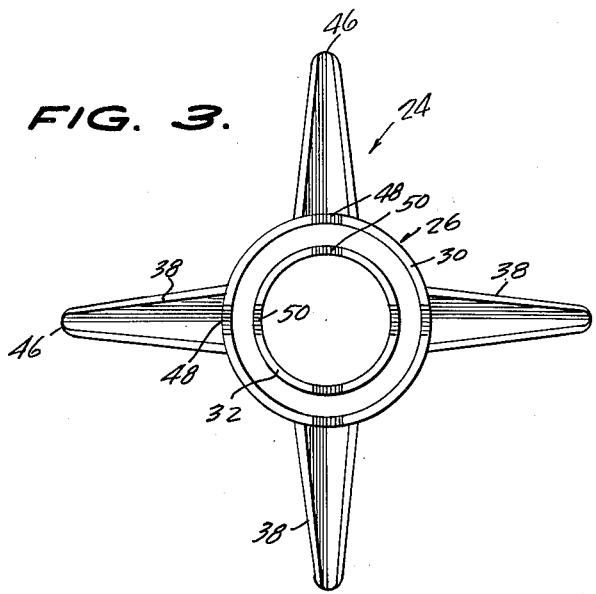
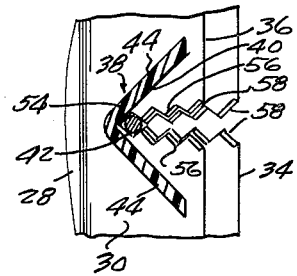
INVENTOR.
MARCEL E. ARES,
BY
McMorrow, Berman + Davidson
ATTORNEYS.

United States Patent Office 3,034,833
Patented May 15, 1962

3,034,833
HUB CAP FOR SPOKED WHEELS
Marcel E. Ares, East Templeton, Mass.
(104 Ridgeway Drive, Feeding Hills, Mass.)
Filed Dec. 5, 1958, Ser. No. 778,536
5 Claims. (Cl. 301—37)

This invention relates to an improved ornamental and safety hub cap for the spoked wheels of baby carriages, strollers, tricycles, and the like.

The primary object of the invention is to provide a highly ornamental and efficient hub cap of the character indicated which protectively covers the hub area of spoked wheels and the axle ends and cotter pins usually exposed thereat, and at least some of the spokes, and which can be economically and desirably made of plastic materials by available mass production methods at relative low cost.

Another object of the invention is to provide a hub cap of the character indicated above which has a hub structure which is provided with improved and more effective dual securing means which are easily and quickly engageable with spokes of a wheel for secure and accurate mounting of the hub cap on a wheel, the hub cap being removable from a wheel without destruction of the hub cap or marring of the wheel.

A further object of the invention is the provision of a molded plastic hub cap of the character indicated which provides means for decoratively improving the safety and appearances of such vehicles as mentioned hereinabove, and which serves to provide ready identification of such vehicles by the owners thereof or others, as when left at supermarkets, playgrounds, and the like.

A still further and important object of the invention is to provide hub caps of the character indicated above which are intended to be, and can readily be given decorative colors, as an incident to their manufacture, either single or multiple, which desirably match, contrast with, or blend with colors of the vehicle bodies or other parts thereof, and whose presence on the vehicles render the vehicles more attractive and saleable, because of having eye-appeal in accord with modern concepts of decorativeness and buying motives.

Other important objects and advantageous features of the invention will be apparent from the following description and the accompanying drawing, wherein, for purposes of illustration only, a specific form of the invention is set forth in detail.

In the drawings:

FIGURE 1 is an outboard side elevation having a hub cap of the invention installed on a spoked vehicle wheel;

FIGURE 2 is a central vertical transverse section taken through FIGURE 1;

FIGURE 3 is an inboard side elevation of the hub cap removed from the wheel; and FIGURE 4 is an enlarged fragmentary transverse section taken on the line 4—4 of FIGURE 1.

Referring in detail to the drawing, wherein like numerals designate like parts throughout the several views, the numeral 10 generally designates a substantially conventional form of spoked vehicle wheel, such as the wheel of a baby carriage, having a rim 12, including thereon a cushion tire 14, radial wire spokes including outboard spokes 16, a tubular hub 18 from which the spokes radiate to the rim 12, an axle end 20 journalled through the hub, and an exposed cotter pin 22 extending through the axle end and located at the outboard end of the hub 18.

A decorative and protective hub cap of the invention, generally designated 24, is shown as being mounted on the wheel 10 at the outboard side thereof and in concealing and protective relation to the cotter pin 22, axle end 20, and wheel hub 18, thereby serving to prevent potential injuries caused by contacts of bodies, fingers, and clothes, especially of children, with these parts.

The hub cap 24 is preferably monolithic body, preferably of molded plastic material, and comprises a dual and hollow hub structure 26, composed of an outboard circular end wall 28, an outer cylindrical wall 30 on and projecting inboardly from the periphery of the end wall 28, and a concentrically spaced inner cylindrical wall 32 within the outer cylindrical wall 30 and projecting inboardly from the end wall 28. As seen in FIGURE 2, the inner cylindrical wall 32 is larger than the outer wall 30 and has an inboard free end or edge 34 which extends inwardly beyond the inboard free edge 36 of the outer wall 30. The inner cylindrical wall 32 is substantially larger in diameter than the wheel hub 18.

Radiating from the exterior of the outer cylindrical wall 30 at equally spaced intervals therearound are spoke covers 38, which are radially outwardly tapered in form and have a preferably V-shaped cross section, as shown in FIGURE 4, to provide therealong concavities 40 for reception therein of outboard wheel spokes 16. The V-cross section of the spoke covers 38 is preferable, not only because of the decorative appearance which they present, but from the standpoint that this shape provides a converging wall trough which terminates at its outboard extremity in a vertex or seat 42 which enters a relative spoke 16 in the cover. The divergent sidewalls 44 of the spoke covers 38 taper in radially outward directions, as seen in FIGURE 2, so that maximum coverage or concealment of spokes 16 occurs near the hub structure 26 and decreases toward the rounded outer ends 46 of the covers 38. As seen in FIGURES 1 and 2, the spoke covers 38 are canted inboardly away from the axis of the hub structure 26, to conform to the canting of the spokes 16. The outer ends 46 of the spoke covers 38 preferably reach to points close to but spaced from the wheel rim 12.

The dual securing means of the hub structure 26 comprises outer tapered serrated-edge slots 48 in the outer cylindrical wall 30 and opening to its inboard edge, and inner tapered serrated-edge slots 50 in the inner cylindrical wall 32 and opening to the inboard edge. The slots 48 and 50 are diametrically aligned with each other, and are together centered within and are symmetrically spaced from the walls 44 of the spoke covers 38, with their smaller and closed ends 54 located in the vertices 42 of the spoke covers. The edges of the slots are formed with V-shaped teeth 56 and adjacent teeth are formed and dimensioned to grippingly receive and hold a wheel spoke 16 therebetween. The inboard divergent sides 58 of the teeth 56 at the longer and inboard ends of the slots serve as guides for inserting wheel spokes 16 into the slots on applying the hub cap 24 to the wheel spokes 16. The outboard tapers of the slots 48 and 50 provide wedging effects of the teeth 56 on the spokes 16 and some desirable tensioning of the teeth around the spokes, produced by the slight spreading of the slots afforded by the nominally resilient character of the material of the cylindrical walls 30 and 32. The sides of the teeth 56 are canted in the same direction as the spokes 16 so as to assure more positive grip on the spokes. As a result, the teeth 56 securely and releasably grip the spokes 16 and prevent displacement or removal of the hub cap 24 from a wheel 10 by any ordinary and casual contacts with the hub cap. Where necessary or desired, the hub cap can be removed from the wheel by pulling the hub cap singly away from the wheel with substantially a single motion.

The tapers of the slots 48 and 50 also enable the slots to grip spokes 16 of different diameters, and the locations of the slots in the hub structure 26 close to the hub 18 of the wheel 10 free the outer portions of the spoke covers of any bearing upon the spokes 16 which would restrict desirable flexing of the spokes and produce working friction between the spokes and the hub cap 24 which would subject the hub cap to loosening action and undue wear.

While the illustrated hub cap 24 has four spoke covers 38, additional spoke covers may be provided thereon if desired. In any case, the simple star-like form of the hub cap 24, resulting from the radiation of tapering V-shaped spoke covers form a cylindrical hub structure 26, produces an attractive, stimulating, and highly decorative transformation of the drab appearance of a spoked vehicle wheel, which effect can be readily enhanced by giving the hub cap a single or a number of decorator colors, harmonizing with or contrasting with colors of the vehicle.

While there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a wheel having a rim, a hub, radial spokes extending between and secured to the hub and the rim, a hub cap comprising a hub structure having a cylindrical wall having a free inboard end, circumferentially spaced spoke covers radiating from said cylindrical wall and positioned to cover spokes, said covers having spoke receiving concavities on their inboard sides receiving the outboard sides of spokes, said cylindrical wall having slots opening to its free inboard end, said slots having toothed edges grippingly receiving wheel spokes.

2. The combination of claim 1, wherein said slots are tapered in an outboard direction and the toothed edges of the slots have wedging engagement with spokes.

3. The combination of claim 1, wherein said toothed edges have teeth therealong which have convergent sides, sides between adjacent teeth having the same angles as the spokes so as to conformably and grippingly engage opposite sides of spokes.

4. The combination, a wheel having a hub and a rim, wire spokes extending between said hub and said rim, a hub cap comprising a hub structure larger in diameter than said wheel hub, said hub structure having a cylindrical side wall having an inboard edge, and slots in said side wall opening to said inboard edge and spaced around said side wall, said slots having outboardly converging side edges wedged against opposed sides of the wheel spokes engaged in the slots, said hub structure comprising an outer side wall spacedly surrounding the first-mentioned side wall, said outer side wall having an inboard edge having slots opening thereto, the slots of the outer side wall having outboardly converging side edges wedged against opposed sides of the wheel spokes engaged in the first side wall slots.

5. The combination, a wheel having a hub and a rim, wire spokes extending between said hub and said rim, a hub cap comprising a hub structure larger in diameter than said wheel hub and smaller in diameter than the rim, said hub structure having a cylindrical side wall having an inboard edge, and slots in said side wall opening to said inboard edge and spaced around said side wall, said slots having outboardly converging side edges wedged against opposed sides of the wheel spokes engaged in the slots, said hub structure comprising an outer side wall spacedly surrounding the first-mentioned side wall, said outer side wall having an inboard edge having slots opening thereto, the slots of the outer side wall having outboardly converging side edges wedged against opposed sides of the wheel spokes engaged in the first side wall slots, and radially elongated spoke covers in line with and radiating from said second side wall, said covers having outer ends located adjacent to the wheel rim.

References Cited in the file of this patent

UNITED STATES PATENTS

| 1,950,082 | Farr | Mar. 6, 1934 |
|---|---|---|
| 1,987,223 | Zerk | Jan. 8, 1935 |
| 2,125,506 | Kroll et al. | Aug. 2, 1938 |
| 2,568,430 | Casabianca | Sept. 18, 1951 |
| 2,621,081 | Mann | Dec. 9, 1952 |
| 2,643,918 | Becker | June 30, 1953 |
| 2,812,215 | Waite | Nov. 5, 1957 |
| 2,937,048 | Hurd | May 17, 1960 |

FOREIGN PATENTS

| 717,020 | France | Oct. 13, 1931 |
|---|---|---|
| 769,819 | France | June 18, 1934 |
| 1,210,695 | France | Oct. 5, 1959 |